US000001517H

United States Statutory Invention Registration [19]

[11] Reg. Number: H1517

[45] Published: Feb. 6, 1996

Erickson et al.

[54] RADIATION CURABLE PRINTING INK COMPOSITION

[75] Inventors: James R. Erickson, Katy; Michael A. Masse, Richmond; Steven H. Dillman; Esther M. Zimmermann, both of Houston, all of Tex.

[73] Assignee: Shell Oil Company, Houston, Tex.

[21] Appl. No.: 91,481

[22] Filed: Jul. 12, 1993

[51] Int. Cl.[6] ..... C08L 61/02

[52] U.S. Cl. ..... 523/400; 525/314; 106/20 R; 106/22 R; 106/23 R

[58] Field of Search ..... 106/20 R, 22 R, 106/23 R; 525/314; 523/400

[56] References Cited

U.S. PATENT DOCUMENTS

| | | | |
|---|---|---|---|
| 3,341,617 | 9/1967 | Schleimer et al. | 585/18 |
| 3,551,518 | 12/1970 | Pornin | 525/244 |
| 3,555,112 | 1/1971 | Winkler | 523/407 |
| 3,607,977 | 9/1971 | Taylor et al. | 525/89 |
| 3,607,982 | 9/1971 | Winkler et al. | 525/314 |
| 3,652,732 | 3/1972 | Makowski et al. | 525/289 |
| 3,699,184 | 10/1972 | Taylor et al. | 525/89 |
| 3,714,297 | 1/1973 | Blaise et al. | 525/126 |
| 3,899,474 | 8/1975 | Goldenberg et al. | 526/171 |
| 3,970,608 | 7/1976 | Fukukawa et al. | 526/19 |
| 4,051,199 | 9/1977 | Udipi et al. | 525/314 |
| 4,074,034 | 2/1978 | Soga et al. | 526/56 |
| 4,086,298 | 4/1978 | Fahrbach et al. | 525/314 |
| 4,091,195 | 5/1978 | Vitek | 526/52 |
| 4,100,046 | 7/1978 | Hodakowski et al. | 204/159.23 |
| 4,131,653 | 12/1978 | Hsieh et al. | 526/20 |
| 4,131,725 | 12/1978 | Udipi | 526/56 |
| 4,135,037 | 1/1979 | Udipi et al. | 428/414 |
| 4,237,245 | 12/1980 | Halasa et al. . | |
| 4,341,672 | 7/1982 | Hsieh et al. | 523/451 |
| 4,391,927 | 7/1983 | Farmer, III | 525/161 |
| 4,417,029 | 11/1983 | Milkovich | 525/314 |
| 4,477,610 | 10/1984 | Ishimura et al. | 523/414 |
| 4,769,416 | 9/1988 | Gelling et al. | 525/90 |
| 4,879,349 | 11/1989 | Hoxmeier | 525/332.8 |
| 5,001,199 | 3/1991 | Hoxmeier | 525/338 |
| 5,034,470 | 7/1991 | Geiser et al. | 525/360 |
| 5,039,755 | 8/1991 | Chamberlain et al. | 525/338 |
| 5,066,728 | 11/1991 | Audett | 525/314 |
| 5,149,895 | 9/1992 | Coolbaugh et al. . | |
| 5,210,359 | 5/1993 | Coolbaugh et al. . | |
| 5,229,464 | 7/1993 | Erickson et al. | 525/314 |
| 5,247,026 | 9/1993 | Erickson et al. | 525/314 |

FOREIGN PATENT DOCUMENTS

| | | |
|---|---|---|
| 0295026 | 12/1988 | European Pat. Off. . |
| 0396780A1 | 11/1990 | European Pat. Off. . |
| 0438287 | 7/1991 | European Pat. Off. . |
| 0441485A2 | 8/1991 | European Pat. Off. . |
| 219779 | 3/1985 | Germany . |
| 249029 | 8/1987 | Germany . |
| 256709 | 5/1988 | Germany . |
| 60-199024 | 10/1985 | Japan . |
| 61-042504 | 3/1986 | Japan . |
| 61-136563 | 6/1986 | Japan . |
| 01115978 | 5/1989 | Japan . |

OTHER PUBLICATIONS

U.S. Ser. No. 692,839, Apr. 29, 1991, Erickson et al.
U.S. Ser. No. 901,349, Jul. 19, 1992, Erickson et al.

*Primary Examiner*—Donald P. Walsh
*Assistant Examiner*—Anthony R. Chi

[57] ABSTRACT

The invention is a radiation curable printing ink composition comprising a liquid viscous epoxidized diene polymer and a pigment. Preferred diene polymers are block copolymers comprising at least interior and exterior diene blocks wherein the exterior diene blocks contain a greater concentration of di-, tri-, and tetrasubstituted olefinic epoxides than the interior blocks and wherein the copolymer contains from 0.1 to 3.0 Meq of olefinic epoxides per gram of copolymer and the peak molecular weights as determined by gel permeation chromatography of the exterior blocks of from 300 to 2000 and the peak molecular weights as determined by gel permeation chromatography of the interior blocks are from 2,000 to 10,000. In another preferred embodiment, the polymer is a star polymer having a random distribution of from 0.5 to 5 Meq of di-, tri-, and tetrasubstituted olefinic epoxides per gram of polymer and greater than four arms wherein the peak molecular weights as determined by gel permeation chromatography of the arms are from 1500 to 15,000.

22 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADIATION CURABLE PRINTING INK COMPOSITION

BACKGROUND OF THE INVENTION

This invention relates to radiation curable printing ink compositions. More specifically, the invention relates to such compositions made using liquid viscous epoxidized diene polymers.

Printing inks have been made using film forming materials such as drying and non-drying oils, cyclised rubber, natural resins such as rosin and shellac, alkyd resins, copolymers of polystyrene, terpene resins, vinyl resins, acrylate resins, bisphenol epoxy resins and various chemical curing agents. Such compositions also include, of course, color pigment. Block polymers of conjugated dienes have not been widely used in printing ink compositions because of their very high viscosity. However, if such materials could be used, they would provide certain advantages, including improved flexibility and adhesion.

Thus, it would be advantageous to provide printing ink compositions which incorporate conjugated diene polymers. The present invention uses low viscosity epoxidized versions of conjugated diene polymers in printing ink compositions.

SUMMARY OF THE INVENTION

The present invention is a radiation curable printing ink composition which comprises a liquid viscous epoxidized diene polymer and a pigment. One preferred polymer for use in the printing ink composition of the present invention is a block copolymer comprising at least interior and exterior diene blocks wherein the exterior diene blocks contain a greater concentration of di-, tri- and tetra-substituted olefinic epoxides than the interior blocks and wherein the copolymer contains from 0.1 to 3.0 Meq of olefinic epoxides per gram of copolymer and the molecular weights of the exterior blocks are from 300 to 2000 and the molecular weights of the interior blocks are from 2000 to 10,000. Another preferred polymer for use in the printing ink composition of the present invention is a star polymer having a random distribution of from 0.5 to 5 Meq of di-, tri- and tetra-substituted olefinic epoxides per gram of polymer and greater than four arms wherein the molecular weights of the arms are from 1500 to 15,000.

DETAILED DESCRIPTION OF THE INVENTION

The general methods of making block copolymers are reviewed by R. P. Quirk and J. Kim, "Recent Advances in Thermoplastic Elastomer Synthesis," Rubber Chemistry and Technology, volume 64 No. 3 (1991), which is incorporated herein by reference. Especially useful is the method of sequential anionic polymerization of monomers. The types of monomers that will undergo living polymerization are relatively limited for the anionic method, with the most favorable being conjugated diolefins and monoalkenyl aromatic hydrocarbon monomers. Generally, a hydrogenation step is needed to prepare a saturated polymer. Hence, a polymer of this invention that is both epoxidized and saturated usually requires both an epoxidation and a hydrogenation step. However, polymers made by sequential polymerization of a suitable diolefin monomer and a monomer having only one carbon-carbon double bond or by sequential polymerization of two different mixtures (ratios) of such monomers, using either a monofunctional initiator, a monofunctional initiator and a coupling agent, or a multifunctional initiator, may be epoxidized and would not have to be hydrogenated to produce an epoxidized polymer of this invention that is saturated.

Polymers containing di-, tri- or tetra-substituted olefinic unsaturation can be prepared by polymerizing one or more olefins, particularly diolefins by themselves or with one or more alkenyl aromatic hydrocarbon monomers. The polymers containing such olefinic unsaturation may be prepared using anionic initiators. Such polymers may be prepared using bulk, solution or emulsion techniques.

Preferably, the polymer is epoxidized under conditions that enhance the epoxidation of the more highly substituted olefinic double bonds, such as by the use of peracetic acid, wherein the rate of epoxidation is generally greater the greater the degree of substitution of the olefinic double bond (rate of epoxidation: tetrasubstituted> trisubstituted> disubstituted> monosubstituted olefinic double bond). Sufficient epoxidation is done to achieve the desired level of epoxidation in the polymer. $^1$H NMR can be used to determine the loss of each type of double bond and the appearance of epoxide.

If a substantially saturated polymer is desired, the epoxidized polymer is hydrogenated to remove substantially all remaining olefinic double bonds (ODB) and normally leaving substantially all of the aromatic double bonds. Alternatively, selective partial hydrogenation of the polymer may be carried out before epoxidation such that from 0.05 to 5 Meq of olefinic double bonds are left intact for subsequent epoxidation. In this case, the epoxidized polymer may be partially hydrogenated in a selective manner with a suitable catalyst and conditions (like those in Re 27,145, U.S. Pat. Nos. 4,001,199 and 4,879,349 or with a titanium catalyst such as is disclosed in U.S. Pat. No. 5,039,755, all of which are incorporated by reference; or by fixed bed hydrogenation} that favor the hydrogenation of the less substituted olefinic double bonds (rate or hydrogenation: monosubstituted> disubstituted> tri-substituted> tetrasubstituted olefinic double bonds) and also leaves aromatic double bonds intact, so as to leave some of the unsaturation intact.

Generally, if a hydrogenation step is used, sufficient improvement of the polymer's chemical and heat stability should be achieved to justify the extra expense and effort involved. For greatest heat stability, all of the olefinic double bonds, anyplace in the polymer, that are not epoxidized should be removed so that less than 1 Meq of ODB per gram of polymer remain, more preferably less than 0.6 Meq/g, and most preferably less than about 0.3 Meq/g of polymer.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, naphthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about O° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

One group of useful block copolymers are based on at least one conjugated diolefin monomer and contain a greater concentration of di-, or tri-, or tetrasubstituted olefinic epoxides in exterior blocks, and lesser concentrations of these epoxides in interior blocks of the polymer. The polymer contains such epoxides within the concentration range of 0.1 to 3.0 milliequivalents per gram of polymer and the ratio of the concentration of such epoxide groups in the exterior blocks to the concentration in the interior blocks is at least 3:1.

Preferred block copolymers of the type described in the preceding paragraph which are useful in the present invention have the formula $$(A\text{-}B\text{-}A_p)_n\text{-}Y_r\text{-}(A_q\text{-}B)_m$$

wherein Y is a coupling agent, or coupling monomers, or initiator, and wherein A and B are polymer blocks which may be homopolymer blocks of conjugated diolefin monomers, copolymer blocks of conjugated diolefin monomers or copolymer blocks of diolefin monomers and monoalkenyl aromatic hydrocarbon monomers. These polymers are described in more detail in allowed copending application Ser. No. 692,839, filed Apr. 29, 1991, entitled "Viscous Conjugated Diene Block Copolymers," which is herein incorporated by reference. Generally, the A blocks should have a greater concentration of more highly substituted aliphatic double bonds than the B blocks have. The A blocks will have a greater concentration of di-, tri-, or tetra-substituted ODB's. For example, in one embodiment, the A blocks will have a greater number of tertiary (tri-substituted) unsaturation (TU) sites per unit of block mass than the B blocks, where a TU site is defined to be an ODB between a tertiary carbon atom and either a primary or secondary carbon atom. The A blocks have a molecular weight of from about 100 to about 3,000 and the B blocks have a molecular weight of from about 1000 to about 15,000. n is greater than 0, r is 0 or 1, m is greater than or equal to 0, and n + m ranges from 1 to 100. p and q may be 0 or 1. When either p or q or both are 1, extra di-, tri-, or tetra-substituted sites are available in the interior of the polymer chain. By way of example, polymer block A could be polyisoprene having about 14.7 milliequivalents of residual ODB's per gram, all of which would be TU sites (14.7 Meq TU/g), and polymer block B could be polybutadiene having 18.5 milliequivalents of residual ODB's per gram, none of which would be TU sites (0 Meq TU/g).

As described above, in general, the advantages of the present invention may be achieved by utilizing an A block which contains more highly substituted olefinic double bonds than the B blocks which should contain less highly substituted double bonds. One preferred specific example of this is the case where the A blocks are formed from isoprene monomer and the B blocks are formed from butadiene monomer. Another special case is the situation wherein the A blocks are formed from 1,4 addition of butadiene monomer and the B blocks are formed from 1,2 addition of butadiene monomer. Another special case is wherein the A blocks are formed from 2,3-dimethyl butadiene (tetra-substituted) and the B blocks are formed from either isoprene or butadiene.

Useful randomly epoxidized star polymers are described in allowed copending application Ser. No. 901,349, filed Jun. 19, 1992, entitled "Randomly Epoxidized Small Star Polymers," which is herein incorporated by reference. That application describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer.

In general, any of the solvents known in the prior art to be useful in the preparation of such polymers may be used. Suitable solvents, then, include straight- and branched chain hydrocarbons such as pentane, hexane, heptane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0 and 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are measured. For anionically polymerized diblock polymers, diblock polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. The following references are herein incorporated by reference:

1. *Modern Size-Exclusion Liquid Chromatography,* W. W. Yau, J. J. Kirkland, D. D. Bly, John Wiley & Sons, New York, NY, 1979.
2. *Light Scattering from Polymer Solution,* M. B. Huglin, ed., Academic Press, New York, NY, 1972.

3. W. Kaye and A. J. Havlik, *Applied Optics*, 12, 541 (1973).
4. M. L. McConnell, *American Laboratory*, 63, May, 1978.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nY$. Coupling monomers are coupling agents where several monomer units are necessary for every chain end to be coupled. Divinylbenzene is the most commonly used coupling monomer and results in star polymers.

Epoxidation of the base polymer can be effected by generally known methods such as by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of about 0 to 130° C. and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $O_2$ in the presence of tetra cyanoethylene. A temperature of about 150° C. and an oxygen partial pressure of about 58 atmospheres is suitable for this reaction.

As discussed above, in order for a polymer to be useful in a printing ink composition, it must have certain characteristics including a relatively low viscosity, i.e., such as about 5000 centipoise (cp) or less at 50 percent solids in toluene. Furthermore, for many applications, it is important that the polymer be radiation curable because this method allows the ink to remain fluid without pot life concerns and yet be rapidly converted to a solid with excellent physical and chemical properties. Further, quick curing allows fast turnaround time which is a vital element to a commercial printer's profitability. The polymers discussed above satisfy these requirements in that they are all viscous liquid materials with a viscosity of less than 5000 cp at 50 percent solids in toluene and they are all radiation curable.

The printing ink compositions of the present invention generally will comprise from 10 to 70 percent by weight of the epoxidized viscous liquid polymer and from 4 to 40 percent by weight of a color pigment which provides the ink with its color so that it can be seen. Examples of color pigments which can be used herein include carbon black, phthalo blue, azoic yellow, and any other commonly used pigment for inks.

In addition to the above two components, it may be advantageous to include a high glass transition temperature ($T_g$) resin in the composition. We have found that high $T_g$ epoxy resins are highly compatible with and cure very well with the polymers of the present invention. Such high $T_g$ epoxy resins include UVR-6110 epoxy resin made by Union Carbide. When a high $T_g$ resin is used, it may comprise from 0 to 60 percent by weight of the overall composition.

Reactive (radiation curable) diluents then can be added to the composition of the present invention include alcohols, vinyl ethers, epoxides, acrylate and methacrylate monomers, oligomers and polymers. They may also be blended with other diene-based polymers. Examples of epoxides include bis(2,3-epoxycyclopentyl) ether, vinylcyclohexenedioxide, limonene dioxide, epoxidized soya and linseed oils and fatty acids. Vernonia oil has been found to cure well with these epoxidized polymers. When a reactive diluent is used, it may comprise from 0 to 30 percent by weight of the composition.

The composition may also contain from 0 to 3 percent by weight of a flow modifier which can prevent fisheyes and craters, and aid in wetting or film smoothness or gloss, such as Cabosil M-5 fumed silica and C-430 fluorocarbon surfactant from 3M. The composition may contain from 0 to 1 percent by weight of a defoamer and 0 and 2 percent by weight of a dispersant. As described above, photoinitiators may be used. If they are, they may comprise from 0 to about 10 percent by weight of the composition.

The compositions of this invention are preferably cured by ultraviolet or electron beam radiation, but radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used.

The most common source of alpha, beta and gamma radiation are radioactive nuclei. A ionizing radiation source with commercial polymer crosslinking application is gamma radiation that is produced from either cobalt-60 or cesium-137 radioactive nuclei. X-rays can be produced through deceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps and visible lasers may also be utilized.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another ether crosslink with another epoxy oxygen, or terminate by recapturing an electron.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of 0.1 Mrads to 5 Mrads are preferred.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydrophenylsulfonium salts. The anions in these salts generally possess low nucleophilic character and include $SbF_6$-, $BF_4$-, $PF_6$- and $AsF_6$-. Specific examples include ( 4-octyloxyphenyl)-phenyl-iodium hexafluoroantimonate, UVI-6990 (from Union Carbide), and FX-512 (3M Company). UVI-6974, an aryl sulfonium salt from Union Carbide, and UV9310C from GE are especially effective. The salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

The printing ink compositions of the present invention may be used in a wide variety of printing ink applications. Some of these applications include flexographic and gravure inks, letter press inks, and screen inks. A preferred use is for lithographic inks, especially radiation cured lithographic inks.

EXAMPLE 1

Polymer 101 is an epoxidized $(I\text{-}B)_n$ DVB star polymer having a molecular weight of 100,000, arm molecular weights of 5800 and an epoxy equivalent weight of 440, with most of the epoxides concentrated in the I (isoprene) block. The viscosity of polymer 101 is about 1900 cp at 50 percent in toluene. An ink was prepared by mixing the following ingredients and then dispersing in a yellow pigment using a standard laboratory mixer with an impellor mixing head.

TABLE 1

| Ingredients | Parts per Hundred |
|---|---|
| Polymer 101 | 41.00 |
| UVR 6110 (Union Carbide) | 41.00 |
| Fluorad FC-430 (3M) | 1.00 |
| BYK P104S (BYK Chemie) | 0.50 |
| UVI 6974 (Union Carbide) | 8.00 |
| Perlyene | 0.80 |
| Azoic Yellow | 9.00 |
| | 101.3 |

In casting a thin film of the ink formulation, about 10 percent tetrahydrofuran was mixed in. A thin film was cast with a doctor blade onto a 1 mil Mylar film and tetrahydrofuran was allowed to evaporate. The film was prebaked at 121° C. and then UV cured using a photocure processor equipped with a single medium pressure mercury lamp using a 30 feed per minute belt speed. No post-bake was required. The liquid film immediately cured to a nontacky solid yellow film with excellent adhesion to the Mylar and had excellent flexibility. The film could be creased sharply with no cracking. It looked excellent through the Mylar. The film had excellent resistance to solvent (toluene). It is believed that the ink formulation could have been improved further by using only the UVI 6974 photoinitiator without the use of the photosensitizer (perlyene), or that even faster cure could be achieved using photoinitiators UV-9310C (GE) and CTX (2-chloro-thioxanthen-9-one).

EXAMPLE 2

The same polymer and procedure used in Example 1 was used to prepare an ink from the formulation set forth below.

TABLE 2

| Ingredients | Parts per Hundred |
|---|---|
| Polymer 101 | 20.00 |
| UVR 6110 (Union Carbide) | 45.00 |
| Vernonia Oil | 16.00 |
| Fluorad FC-430 (3M) | 1.00 |
| BYK P104S (BYK Chemie) | 0.50 |
| UVI 6974 (Union Carbide) | 8.00 |
| Perlyene | 0.80 |
| Azoic Yellow | 7.00 |
| | 98.3 |

The same procedure for casting a film as used in Example 1 was used herein. The results achieved were the same. The liquid film immediately cured to a nontacky solid yellow film with excellent adhesion to the Mylar. It also had excellent flexibility. The film could be creased sharply with no cracking and it looked excellent through the Mylar. The film had excellent resistance to the solvent. Again, it is believed that better results could have been achieved with the process modifications described at the end of Example 1.

EXAMPLE 3

Polymer 204 is an epoxidized and hydrogenated I-S/B-I linear polymer of 5600 molecular weight and 800 epoxy equivalent weight with all the epoxies on the isoprene endblocks. The polymer has 63 percent styrene content in the S/B random midblock. The 50 percent solution viscosity in toluene of this polymer is about 100 cp.

86 parts of polymer 204 and 10 parts of the azoic yellow pigment used in Examples 1 and 2 (Hostaperm yellow H3G) are mixed as described in Example 1. Four parts of the photoinitiator, UVI 6974, are then mixed in with the other two ingredients. A thin film is cast and cured as described in Example 1. The resultant film is a flexible ink with excellent solvent resistance.

We claim:

1. A radiation curable printing ink composition comprising a liquid viscous diene block polymer wherein a portion of the olefinic double bonds in the diene are epoxidized and a pigment.

2. The composition of claim 1 wherein the polymer is a block copolymer comprising at least interior and exterior diene blocks wherein the exterior diene blocks contain a greater concentration of di-, tri- and tetrasubstituted olefinic epoxides than the interior blocks and wherein the copolymer contains from 0.1 to 3.0 Meq of olefinic epoxides per gram of copolymer and the peak molecular weights as determined by gel permeation chromatography of the exterior blocks are from 300 to 2000 and the peak molecular weights as determined by gel permeation chromatography of the interior blocks are from 2000 to 10,000.

3. The composition of claim 2 wherein the external diene block is 1,4-polyisoprene and the internal diene block is polybutadiene.

4. The composition of claim 2 wherein the external diene block is 1,4-polybutadiene and the internal diene block is 1,2-polybutadiene.

5. The composition of claim 2 wherein the polymer is hydrogenated such that less than 1 Meq of olefinic double bonds per gram of polymer remain in the block copolymer.

6. The composition of claim 5 wherein the ratio of the amount of epoxy in the external blocks to that in the internal blocks is at least 3:1.

7. The composition of claim 1 wherein the polymer is crosslinked through at least some of the epoxy functionality by exposure to radiation.

8. The composition of claim 2 wherein the copolymer is crosslinked through at least some of the epoxy functionality by exposure to radiation.

9. The composition of claim 2 wherein the block copolymer is of the formula $(A\text{-}B)_k$ or $A\text{-}(B\text{-}A)_j$ wherein A is an exterior diene block; and wherein B is an interior diene block; and wherein j is 1 to 6 and k is 2 to 6.

10. The composition of claim 9 wherein the copolymer is hydrogenated such that less than 1Meq of olefinic double bonds per gram of polymer remain in the copolymer.

11. The composition of claim 9 wherein the copolymer is crosslinked through at least some of the epoxy functionality by exposure to radiation.

12. The composition of claim 2 wherein block copolymer is of the formula $D_n\text{-}X\text{-}C_r$ wherein D is $A\text{-}B\text{-}M_p$ or $(A\text{-}B)_j\text{-}M_p$ or $A\text{-}(B\text{-}A)_j\text{-}M_p$; and wherein A is an exterior diene block; and wherein B is an interior diene block; and wherein C is a block or multiblock segment which has a peak molecular weight as determined by gel permeation chromatography of 100 to 18,000 and comprises A, B or methacrylate or mixtures thereof but is not identical to D; and wherein the B block may contain a monoalkenyl aromatic hydrocarbon monomer and the A blocks may comprise up to 99% of a monoalkenyl aromatic hydrocarbon monomer; and wherein M is a miniblock of a monomer selected form the group consisting of vinyl aromatic hydrocarbons and dienes and which has a peak molecular weight as determined by gel permeation chromatography of 50 to 3000; and wherein X is a coupling agent or coupling monomers or initiator, j is 1 to 6, $n \geqq 2$, $r \geqq 0$, $n \geqq r$, n+r ranges from 3 to 100 and p is 0 or 1.

13. The composition of claim 12 wherein the polymer is hydrogenated such that less than 1 Meq of olefinic double bonds per gram of polymer remain in the copolymer.

14. The block copolymer of claim 12 wherein the copolymer is crosslinked through at least some of the epoxy functionality by exposure to radiation.

15. The composition of claim 1 wherein the polymer is a star polymer having a random distribution of from 0.5 to 5 Meq of di-, tri- and tetrasubstituted olefinic epoxides per gram of polymer and greater than 4 arms wherein the peak molecular weights as determined by gel permeation chromatography of the arms are from 1500 to 15,000.

16. The composition of claim 15 wherein the arms are primarily 1,4-polyisoprene.

17. The composition of claim 15 wherein the arms are primarily 1,4-polybutadiene.

18. The composition of claim 15 wherein the polymer is hydrogenated such that less than 1Meq of olefinic double bonds per gram of polymer remain in the polymer.

19. The composition of claim 15 wherein the polymer is crosslinked through at least some of the epoxy functionality by exposure to radiation.

20. The composition of claim 15 wherein the star polymer is of the formula $D_n\text{-}X\text{-}C_r$ wherein D is $(A\text{-}M_p)$; and wherein A is a block comprising at least one diene and the peak molecular weight as determined by gel permeation chromatography of A is from 1,500 to 15,000; and wherein C is a block or multiblock segment which has a peak molecular weight as determined by gel permeation chromatography of 50 to 15,000 and comprises at least one diene or vinyl aromatic hydrocarbon or methacrylate or combinations thereof but is not identical to D; and wherein the A blocks may comprise up to 99% of a monoalkenyl aromatic hydrocarbon monomer; and wherein M is a miniblock of a monomer selected from the group consisting of vinyl aromatic hydrocarbons and dienes and has a peak molecular weight as determined by gel permeation chromatography of 50 to 1000; and wherein X is a coupling agent or coupling monomers or initiator, $n \geqq 2$, $r \geqq 0$, $n \geqq r$, $n+r$ ranges from greater than 4 to 100 and p is 0 or 1.

21. The composition of claim 20 wherein the polymer is hydrogenated such that less than 1 Meq of olefinic double bonds per gram of polymer remain in the copolymer.

22. The composition of claim 20 wherein the polymer is crosslinked through at least some of the epoxy functionality by exposure to radiation.

* * * * *